(12) United States Patent
Nagaishi et al.

(10) Patent No.: US 12,046,393 B2
(45) Date of Patent: Jul. 23, 2024

(54) SUPERCONDUCTIVE WIRE, STACKED SUPERCONDUCTIVE WIRE, SUPERCONDUCTIVE COIL AND SUPERCONDUCTIVE CABLE

(71) Applicant: Sumitomo Electric Industries, Ltd., Osaka (JP)

(72) Inventors: Tatsuoki Nagaishi, Osaka (JP); Takashi Yamaguchi, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 830 days.

(21) Appl. No.: 16/973,643

(22) PCT Filed: Jun. 15, 2018

(86) PCT No.: PCT/JP2018/022883
§ 371 (c)(1),
(2) Date: Dec. 9, 2020

(87) PCT Pub. No.: WO2019/239574
PCT Pub. Date: Dec. 19, 2019

(65) Prior Publication Data
US 2021/0257128 A1 Aug. 19, 2021

(51) Int. Cl.
*H01B 12/06* (2006.01)
*H01F 6/06* (2006.01)
*H01R 4/68* (2006.01)

(52) U.S. Cl.
CPC ............... *H01B 12/06* (2013.01); *H01F 6/06* (2013.01); *H01R 4/68* (2013.01)

(58) Field of Classification Search
CPC ..................................................... H01B 12/06
See application file for complete search history.

(56) References Cited

U.S. PATENT DOCUMENTS 10,249,421 B2 * 4/2019 Fujita ..................... H01F 6/065
2006/0073979 A1 * 4/2006 Thieme ............. H10N 60/0801
505/434

(Continued)

FOREIGN PATENT DOCUMENTS

CN 1905081 A 1/2007
JP 2010-80199 A 4/2010

(Continued)

*Primary Examiner* — Paul A Wartalowicz
(74) *Attorney, Agent, or Firm* — Faegre Drinker Biddle & Reath LLP

(57) ABSTRACT

A superconductive wire according to an embodiment of the present disclosure includes a first member and a second member. The first member includes a first substrate made of a conductive material, a first intermediate layer made of a conductive material and disposed on the first substrate, and a first superconductive layer made of a superconductive material and disposed on the first intermediate layer. The second member includes a second substrate made of a conductive material, a second intermediate layer made of a conductive material and disposed on the second substrate, and a second superconductive layer made of a superconductive material and disposed on the second intermediate layer. The first member and the second member are stacked along a thickness direction of the superconductive wire so that the first superconductive layer and the second superconductive layer face each other. The first superconductive layer is electrically connected to the second superconductive layer.

16 Claims, 9 Drawing Sheets

(56) References Cited

U.S. PATENT DOCUMENTS

| | | | |
|---|---|---|---|
| 2009/0298696 A1* | 12/2009 | Otto | H10N 60/80 |
| | | | 174/125.1 |
| 2012/0208703 A1* | 8/2012 | Okayama | B32B 15/20 |
| | | | 505/239 |
| 2013/0040819 A1* | 2/2013 | Haraguchi | H01F 6/065 |
| | | | 505/211 |
| 2016/0216348 A1 | 7/2016 | Roth et al. | |
| 2017/0309384 A1 | 10/2017 | Fujita | |
| 2018/0330849 A1* | 11/2018 | Rupich | H01B 12/14 |
| 2018/0358153 A1 | 12/2018 | Konishi et al. | |

FOREIGN PATENT DOCUMENTS

| | | |
|---|---|---|
| JP | 2012-156048 A | 8/2012 |
| JP | 2013-175293 A | 9/2013 |
| JP | 2013-543631 A | 12/2013 |
| JP | 2016-537611 A | 12/2016 |
| JP | 2017-91681 A | 5/2017 |
| WO | WO-2012/037231 A1 | 3/2012 |
| WO | WO-2016/080524 A1 | 5/2016 |

* cited by examiner

SUPERCONDUCTIVE WIRE, STACKED SUPERCONDUCTIVE WIRE, SUPERCONDUCTIVE COIL AND SUPERCONDUCTIVE CABLE

TECHNICAL FIELD

The present disclosure relates to a superconductive wire, a stacked superconductive wire, a superconductive coil, and a superconductive cable.

BACKGROUND ART

For example, Japanese Patent Laying-Open No. 2012-156048 (PTL 1) describes a conventional superconductive wire.

The superconductive wire described in PTL 1 includes a substrate, an intermediate layer disposed on the substrate, an oxide superconductor layer disposed on the intermediate layer, and a stabilization layer disposed on the oxide superconductor layer. The intermediate layer is made of an insulating material.

CITATION LIST

Patent Literature

PTL 1: Japanese Patent Laying-Open No. 2012-156048

SUMMARY OF INVENTION

A superconductive wire according to an embodiment of the present disclosure includes a first member and a second member. The first member includes a first substrate made of a conductive material, a first intermediate layer made of a conductive material and disposed on the first substrate, and a first superconductive layer made of a superconductive material and disposed on the first intermediate layer. The second member includes a second substrate made of a conductive material, a second intermediate layer made of a conductive material and disposed on the second substrate, and a second superconductive layer made of a superconductive material and disposed on the second intermediate layer. The first member and the second member are stacked along a thickness direction of the superconductive wire so that the first superconductive layer and the second superconductive layer face each other. The first superconductive layer is electrically connected to the second superconductive layer.

DETAILED DESCRIPTION

Figure 1:
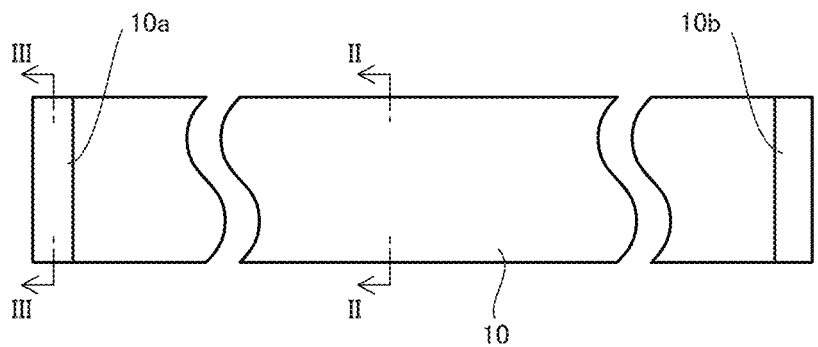
FIG. 1 is a top view illustrating a superconductive wire 10 according to an embodiment.

Problem to be Solved by the Present Disclosure

In the superconductive wire described in PTL 1, when a quench (a phenomenon of transition from the superconductive state to the normal conductive state) occurs due to the local degradation of characteristics in the oxide superconductor layer, an electric current flowing in the oxide superconductor layer is bypassed to the stabilization layer. In other words, in the superconductive wire described in PTL 1, there is only one path to bypass the electric current when a quench occurs. Therefore, in the superconductive wire described in PTL 1, it is required to form the stabilization layer thicker so as to ensure the anti-quench resistance, which leads to an increase in cost. Thus, the superconductive wire described in PTL 1 has a room for improvement in the anti-quench resistance.

The present disclosure has been made in view of the above-described problems in the prior art. Specifically, the present disclosure provides a superconductive wire capable of improving the anti-quench resistance.

Advantageous Effect of the Present Disclosure

According to the superconductive wire of the present disclosure, the anti-quench resistance is improved.

Description of Aspects of the Present Disclosure

First, a description will be given on each aspect of the present disclosure.

(1) A superconductive wire according to an aspect of the present disclosure includes a first member and a second member. The first member includes a first substrate made of a conductive material, a first intermediate layer made of a conductive material and disposed on the first substrate, and a first superconductive layer made of a superconductive material and disposed on the first intermediate layer. The second member includes a second substrate made of a conductive material, a second intermediate layer made of a conductive material and disposed on the second substrate, and a second superconductive layer made of a superconductive material and disposed on the second intermediate layer. The first member and the second member are stacked along a thickness direction of the superconductive wire so that the first superconductive layer and the second superconductive layer face each other. The first superconductive layer is electrically connected to the second superconductive layer.

In the superconductive wire described above in (1), when a quench occurs in the first superconductive layer (or the second superconductive layer), an electric current flowing in the first superconductive layer (or the second superconductive layer) flows in the second superconductive layer (or the first superconductive layer) and the first substrate (or the second substrate). In other words, in the superconductive wire of the above (1), there are two paths to bypass the electric current when a quench occurs. Therefore, according to the superconductive wire described above in (1), it is possible to improve the anti-quench resistance. In the superconductive wire described above in (1), the first superconductive layer and the second superconductive layer are arranged close to the neutral line of the superconductive wire. Therefore, according to the superconductive wire described above in (1), it is possible to reduce the bending stress acting on the first superconductive layer and the second superconductive layer when the superconductive wire is being bent.

(2) In the superconductive wire according to (1), the first superconductive layer may be superconductively bonded to the second superconductive layer.

According to the superconductive wire described above in (2), when a quench occurs in the first superconductive layer (or the second superconductive layer), the electric current flowing in the first superconductive layer (or the second superconductive layer) may be bypassed to the second superconductive layer (or the first superconductive layer) without passing through the normal conductor. Further, according to the superconductive wire described above in (2), since the thickness of the superconductive layer is substantially increased by superconductively bonding the first superconductive layer to the second superconductive layer, the local degradation of characteristics is less likely to occur in the superconductive layer.

(3) In the superconductive wire according to (1), the first member may further include a first protective layer made of silver or a silver alloy and disposed on the first superconductive layer, the second member may further include a second protective layer made of silver or a silver alloy and disposed on the second superconductive layer, and the first protective layer may be directly bonded to the second protective layer.

According to the superconductive wire described above in (3), when a quench occurs in the first superconductive layer (or the second superconductive layer), the electric current flowing in the first superconductive layer (or the second superconductive layer) may be bypassed to the second superconductive layer (or the first superconductive layer) without passing through a material having a higher electric resistance.

(4) The superconductive wire described above in (1) may further include a bonding layer, the first member may further include a first protective layer made of a conductive material and disposed on the first superconductive layer, the second member may further include a second protective layer made of a conductive material and disposed on the second superconductive layer, and the first protective layer may be bonded to the second protective layer via the bonding layer.

In the superconductive wire described above in (4), since there are two paths to bypass the electric current when a quench occurs, the anti-quench resistance is improved.

(5) In the superconductive wire according to (4), the first protective layer and the second protective layer may be made of silver or a silver alloy, and the bonding layer may be made of solder.

According to the superconductive wire described above in (5) above, it is possible to improve the bonding between the first member and the second member by the bonding layer while improving the anti-quench resistance.

(6) In the superconductive wire according to (4) or (5), the bonding layer may be exposed at an end of the superconductive wire in the longitudinal direction by removing either the first member or the second member therefrom.

According to the superconductive wire described above in (6), it is possible to connect the superconductive wire to an external power source via the bonding layer.

(7) In the superconductive wire according to any one of (4) to (6), the first protective layer and the second protective layer each may have a thickness of 5 μm or less.

Since the first protective layer (or the second protective layer) is only used to bypass the electric current to the second superconductive layer (or the first superconductive layer) when a quench occurs in the first superconductive layer (or the second superconductive layer), even if the first protective layer and the second protective layer are formed to be relatively thin, the influence on the anti-quench resistance is small. On the other hand, since the first protective layer and the second protective layer are formed to be relatively thin, the first superconductive layer and the second superconductive layer may be arranged closer to the neutral line of the superconductive wire, which makes it possible to further reduce the bending stress acting on the first superconductive layer and the second superconductive layer when the superconductive wire is being bent. Thus, according to the superconductive wire described above in (7), it is possible to further reduce the bending stress acting on the first superconductive layer and the second superconductive layer while improving the anti-quench resistance.

(8) In the superconductive wire according to any one of the above (1) to (7), the first substrate may include a first base layer and a first conductive layer made of a material having a lower electric resistance than a material of the first base layer and disposed between the first base layer and the first intermediate layer, and the second substrate may include a second base layer, and a second conductive layer made of a material having a lower electric resistance than a material of the second base layer and disposed between the second base layer and the second intermediate layer.

As described above, when a quench occurs in the first superconductive layer (or the second superconductive layer), the electric current flowing in the first superconductive layer (or the second superconductive layer) is also bypassed to the first substrate (or the second substrate), and the bypassed current flows through the first conductive layer (or the second conductive layer) having a relatively low electric resistance, which makes it possible for the superconductive wire according to (8) to reduce the electric resistance when bypassing the electric current.

(9) In the superconductive wire according to (8), the first conductive layer may be exposed at an end of the superconductive wire in the longitudinal direction by removing the first base layer therefrom.

Thus, the superconductive wire according to (9) is electrically connected to an external power source via the first conductive layer having a relatively low electric resistance, and thereby, it is possible for the superconductive wire described above in (9) to reduce the connection resistance to the external power source.

(10) In the superconductive wire according to (8) or (9), the second conductive layer may be exposed at an end of the superconductive wire in the longitudinal direction by removing the second base layer therefrom.

Thus, the superconductive wire according to (10) is electrically connected to an external power source via the second conductive layer having a relatively low electric resistance, and thereby, it is possible for the superconductive wire described above in (10) to reduce the connection resistance to the external power source.

(11) In the superconductive wire according to any one of (8) to (10), the first conductive layer and the second conductive layer may be made of copper or a copper alloy, and the first substrate and the second substrate may be made of stainless steel or Hastelloy.

According to the superconductive wire described above in (11), it is possible to reduce the electric resistance when bypassing the electric current.

(12) In the superconductive wire according to the above (1), the first member and the second member may be spaced from each other at an end of the superconductive wire in the longitudinal direction.

According to the superconductive wire described above in (12), the superconductive wire may be connected to an external power source by inserting a lead between the first member and the second member.

(13) A stacked superconductive wire according to an aspect of the present disclosure includes a plurality of superconductive wires described above in any one of (1) to (12). The plurality of superconductive wires are stacked along a thickness direction of the stacked superconductive wire, and a value obtained by dividing a thickness of the stacked superconductive wire by a width of the stacked superconductive wire in a direction orthogonal to the longitudinal direction of the stacked superconductive wire is 0.5 or more and 2.0 or less.

According to the stacked superconductive wire described above in (13), since the ratio of the thickness to the width in the direction orthogonal to the longitudinal direction is relatively large, the wire is easily handled.

(14) A superconductive coil according to an aspect of the present disclosure includes the superconductive wire according to any one of (1) to (12) and an insulating material. The superconductive wire is wound around a central axis of the superconductive coil and impregnated with the insulating material.

Due to the difference in thermal expansion coefficient between the superconductive wire and the insulating material, a tensile stress may act on the superconductive wire in a direction of peeling off the superconductive layer. This tensile stress may peel the superconductive layer off from the superconductive wire. However, in the superconductive wires according to any one of (1) to (12), since the superconductive layer is sandwiched between the first substrate and the second substrate, the tensile stress is less likely to act on the superconductive layer. Therefore, according to the superconductive coil (14), it is possible to prevent the superconductive layer (the first superconductive layer and the second superconductive layer) from being peeled off by the tensile stress caused by the difference in thermal expansion coefficient between the superconductive wire and the insulating material.

(15) In the superconductive coil according to (14), the superconductive wire may have a lead-out portion drawn out from the superconductive wire wound around the central axis of the superconductive coil, and the minimum radius of curvature of the lead-out portion in the superconductive wire may be 20 mm or less.

As described above, in the superconductive wires according to any one of (1) to (12), the first superconductive layer and the second superconductive layer are arranged close to the neutral line of the superconductive wire, and thereby, it is possible to reduce the bending stress acting on the first superconductive layer and the second superconductive layer when the superconductive wire is being bent. Therefore, according to the superconductive coil (15), it is possible to form the superconductive coil so that the minimum radius of curvature of the lead-out portion is 20 mm or less.

(16) A superconductive cable according to an aspect of the present disclosure includes the superconductive wire according to any one of (1) to (12) and a former. The superconductive wire is spirally wound around a central axis of the former on the outer peripheral surface of the former, and the minimum radius of curvature of the superconductive wire is 20 mm or less.

As described above, in the superconductive wires according to any one of (1) to (12), the first superconductive layer and the second superconductive layer are arranged close to the neutral line of the superconductive wire, and thereby, it is possible to reduce the bending stress acting on the first superconductive layer and the second superconductive layer when the superconductive wire is being bent. Therefore, according to the superconductive cable (16), it is possible to form the superconductive coil so that the minimum radius of curvature is 20 mm or less.

Details of Embodiments of the Present Disclosure

Details of embodiments of the present disclosure will now be described with reference to the drawings. In the following drawings, the same or corresponding portions are denoted by the same reference numerals, and the description thereof will not be repeated.

(Configuration of Superconductive Wire)

Hereinafter, the configuration of a superconductive wire 10 according to an embodiment will be described.

FIG. 1 is a top view illustrating a superconductive wire 10 according to an embodiment. As illustrated in FIG. 1, the superconductive wire 10 has a first end 10a and a second end 10b. The first end 10a is one end of the superconductive wire 10 in the longitudinal direction. The second end 10b is the other end of the superconductive wire 10 that is opposite to the first end 10a.

Figure 2:
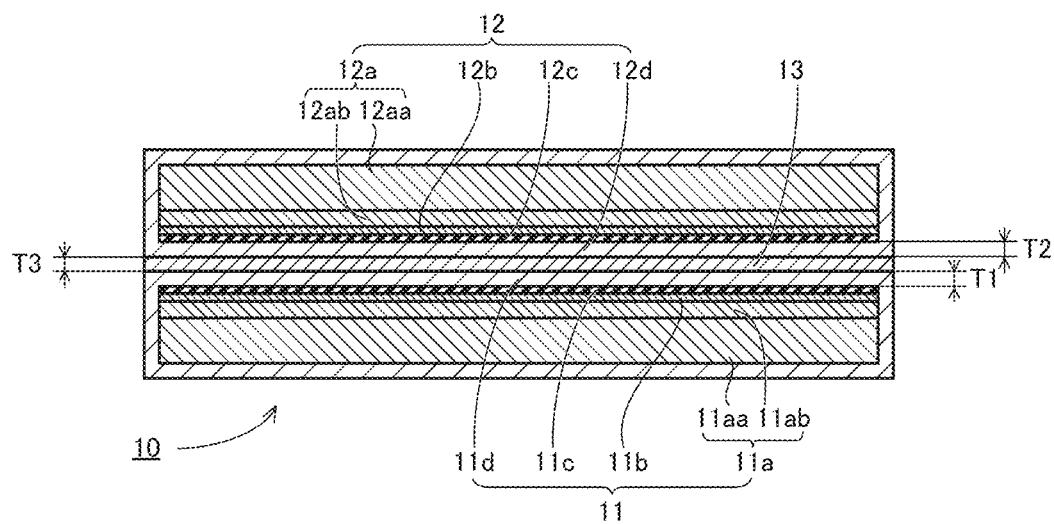
FIG. 2 is a cross-sectional view taken along line II-II of FIG. 1.

FIG. 2 is a cross-sectional view taken along line II-II of FIG. 1. As illustrated in FIG. 2, the superconductive wire 10 includes a first member 11, a second member 12, and a bonding layer 13.

The first member 11 includes a first substrate 11a, a first intermediate layer 11b, a first superconductive layer 11c, and a first protective layer 11d.

The first substrate 11a is made of a conductive material. The first substrate 11a includes a first base layer 11aa and a first conductive layer 11ab. The first base layer 11aa and the first conductive layer 11ab are made of a conductive material. The electric resistance of the first conductive layer 11ab is lower than the electric resistance of the first base layer 11aa. The first conductive layer 11ab is disposed on the first base layer 11aa.

The first base layer 11aa is made of, for example, stainless steel or Hastelloy (registered trademark). The first conductive layer 11ab is made of, for example, copper (Cu) or a copper alloy. It should be noted that the material of the first base layer 11aa and the first conductive layer 11ab is not limited thereto.

The first intermediate layer 11b is disposed on the first substrate 11a. More specifically, the first intermediate layer 11b is disposed on the first conductive layer 11ab. The first intermediate layer 11b is made of a conductive material. The first intermediate layer 11b is made of, for example, strontium titanate ($SrTiO_3$) doped with niobium (Nb). It should be noted that the material of the first intermediate layer 11b is not limited thereto.

The first superconductive layer 11c is made of a superconductor. The first superconductive layer 11c is made of, for example, an oxide superconductor. For example, the oxide superconductor of the first superconductive layer 11c may be $REBaCu_3O_x$ (x is any number of 6 or more and 8 or less, and RE represents a rare earth element such as yttrium (Y), gadolinium (Gd), samarium (Sm), or holmium (Ho)). The first superconductive layer 11c is disposed on the first intermediate layer 11b. It should be noted that the material of the first superconductive layer 11c is not limited thereto.

As described above, since the first intermediate layer 11b is made of a conductive material, the first superconductive layer 11c and the first substrate 11a (i.e., the first conductive layer 11ab) are electrically connected to each other.

The first protective layer 11d is disposed to cover the outer peripheral surface of the first member 11. More specifically, the first protective layer 11d is disposed on the upper surface of the first superconductive layer 11c, the side surfaces of the first superconductive layer 11c, the side surfaces of the first intermediate layer 11b, the side surfaces of the first conductive layer 11ab, the side surfaces of the first base layer 11aa, and the bottom surface of the first base layer 11aa. The first protective layer 11d is made of a conductive material. The first protective layer 11d is made of, for example, silver (Ag) or a silver alloy. It should be noted that the material of the first protective layer 11d is not limited thereto. The thickness T1 of the first protective layer 11d on the first superconductive layer 11c is, for example, 10 µm or less. The thickness T1 is preferably 5 µm or less. The thickness T1 is, for example, 1 µm or more.

The second member 12 includes a second substrate 12a, a second intermediate layer 12b, a second superconductive layer 12c, and a second protective layer 12d.

The second substrate 12a is made of a conductive material. The second substrate 12a includes a second base layer 12aa and a second conductive layer 12ab. The second base layer 12aa and the second conductive layer 12ab are made of a conductive material. The electric resistance of the second conductive layer 12ab is lower than the electric resistance of the second base layer 12aa. The second conductive layer 12ab is disposed on the second base layer 12aa. In the above example, it is described that the first substrate 11a includes the first base layer 11aa and the first conductive layer 11ab, and the second substrate 12a includes the second base layer 12aa and the second conductive layer 12ab, it is acceptable that at least one of the first substrate 11a and the second substrate 12a is formed by a base layer only.

The second base layer 12aa is made of, for example, stainless steel or Hastelloy (registered trademark). The second conductive layer 12ab is made of, for example, copper or a copper alloy. It should be noted that the material of the second base layer 12aa and the second conductive layer 12ab is not limited thereto.

The second intermediate layer 12b is disposed on the second substrate 12a. More specifically, the second intermediate layer 12b is disposed on the second conductive layer 12ab. The second intermediate layer 12b is made of a conductive material. The second intermediate layer 12b is made of, for example, strontium titanate doped with niobium. It should be noted that the material of the second intermediate layer 12b is not limited thereto.

The second superconductive layer 12c is made of a superconductor. The second superconductive layer 12c is made of, for example, an oxide superconductor. The oxide superconductor of the second superconductive layer 12c is, for example, $REBaCu_3O_x$. It should be noted that the material of the second superconductive layer 12c is not limited thereto. The second superconductive layer 12c is disposed on the second intermediate layer 12b.

As described above, since the second intermediate layer 12b is made of a conductive material, the second superconductive layer 12c and the second substrate 12a (the second conductive layer 12ab) are electrically connected to each other.

The second protective layer 12d is disposed to cover the outer peripheral surface of the second member 12. More specifically, the second protective layer 12d is disposed on the upper surface of the second base layer 12aa, the side surfaces of the second base layer 12aa, the side surfaces of the second conductive layer 12ab, the side surfaces of the second intermediate layer 12b, the side surfaces of the second superconductive layer 12c, and the bottom surface of the second superconductive layer 12c. The second protective layer 12d is made of a conductive material. The second protective layer 12d is made of, for example, silver or a silver alloy. It should be noted that the material of the second protective layer 12d is not limited thereto. The thickness T2 of the second protective layer 12d on the second superconductive layer 12c is, for example, 10 µm or less. The thickness T2 is preferably 5 µm or less. The thickness T2 is, for example, 1 nm or more.

The first member 11 and the second member 12 are stacked along the thickness direction of the superconductive wire 10 such that the first superconductive layer 11c and the second superconductive layer 12c face each other with the first protective layer 11d and the second protective layer 12d interposed therebetween.

The bonding layer 13 is disposed between the first member 11 and the second member 12. Specifically, the bonding layer 13 is disposed between the first protective layer 11d on the first superconductive layer 11c and the second protective layer 12d on the second superconductive layer 12c. The bonding layer 13 bonds together the first protective layer 11d on the first superconductive layer 11c and the second protective layer 12d on the second superconductive layer 12c. The bonding layer 13 may be disposed so as to reach the side surfaces of the first member 11 and the side surfaces of the second member 12. The bonding layer 13 is made of a conductive material. The bonding layer 13 is, for example, a solder. The thickness T3 of the bonding layer 13 is, for example, 10 µm or less.

As described above, since the first protective layer 11d, the second protective layer 12d and the bonding layer 13 are made of a conductive material, the first superconductive layer 11c and the second superconductive layer 12c are electrically connected to each other.

Figure 3:
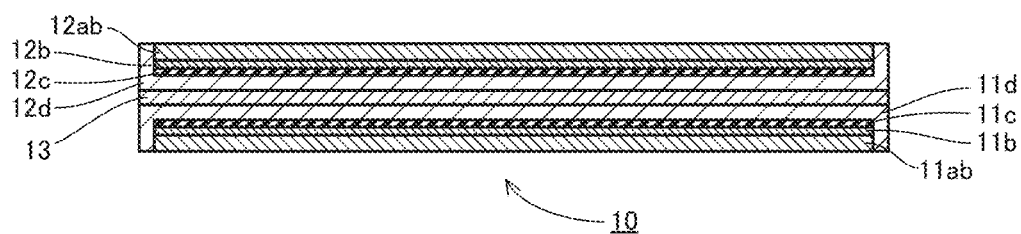
FIG. 3 is a cross-sectional view taken along line III-III in FIG. 1.

FIG. 3 is a cross-sectional view taken along line III-III in FIG. 1. As illustrated in FIG. 3, the first conductive layer 11ab is exposed at the first end 10a by removing the first base layer 11aa therefrom, and the second conductive layer 12ab is exposed at the first end 10a by removing the second base layer 12aa therefrom. It is acceptable that at least one of the first conductive layer 11*ab* and the second conductive layer 12*ab* is exposed at the first end 10*a* by removing at least one of the first base layer 11*aa* and the second base layer 12*aa* therefrom. The superconductive wire 10 is connected to an external power source via the first conductive layer 11*ab* and the second conductive layer 12*ab* exposed at the first end 10*a*.

Although not shown, at least one of the first conductive layer 11*aa* and the second conductive layer 12*ab* may be exposed at the second end 10*b* by removing at least one of the first base layer 11 as and the second base layer 12*aa* therefrom.

Figure 4:
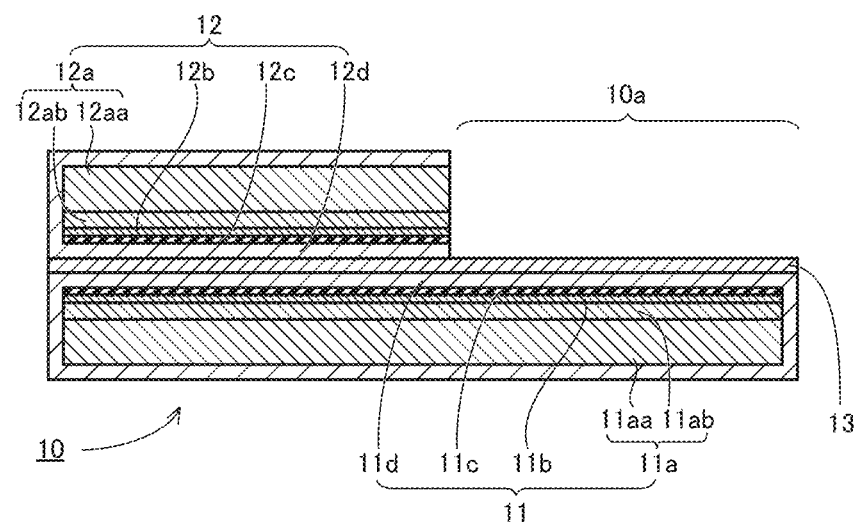
FIG. 4 is a cross-sectional view taken along the longitudinal direction of a first end 10*a* of a superconductive wire 10 according to a first modification of the embodiment.

FIG. 4 is a cross-sectional view taken along the longitudinal direction of a first end 10*a* of a superconductive wire 10 according to a first modification of the embodiment. As illustrated in FIG. 4, the second member 12 may be removed from the first end 10*a*. Thus, the bonding layer 13 is exposed at the first end 10*a*. It is acceptable that the bonding layer 13 is exposed at the first end 10*a* by removing the first member 11 from the first end 10*a*. Thereby, the superconductive wire 10 is connected to an external power source via the bonding layer 13 exposed by removing the second member 12 (or the first member 11). Although not shown, it is acceptable that the bonding layer 13 is also exposed at the second end 10*b* by removing either the first member 11 or the second member 12 from the second end 10*b*.

Figure 5:
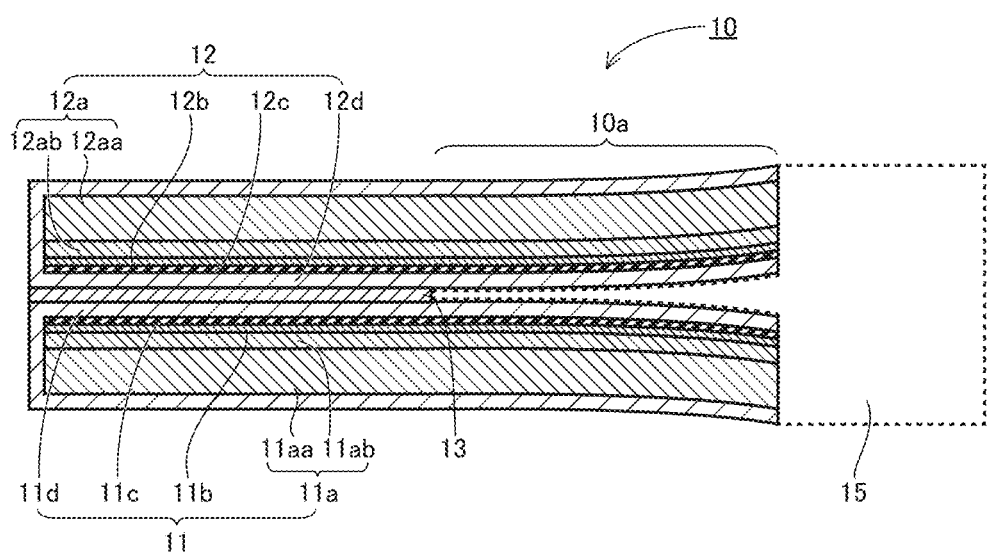
FIG. 5 is a cross-sectional view taken along the longitudinal direction of a first end 10*a* of a superconductive wire 10 according to a second modification of the embodiment.

FIG. 5 is a cross-sectional view taken along the longitudinal direction of a first end 10*a* of a superconductive wire 10 according to a second modification of the embodiment. As illustrated in FIG. 5, the first member 11 and the second member 12 may be spaced from each other at the first end 10*a*. For example, the first member 11 and the second member 12 are spaced from each other by melting the bonding layer 13 at the first end 10*a*. A lead 15 may be sandwiched between the first member 11 and the second member 12 at the first end 10*a*. The lead 15 is made of, for example, copper. The superconductive wire 10 is connected to an external power source via the lead 15.

Figure 6:
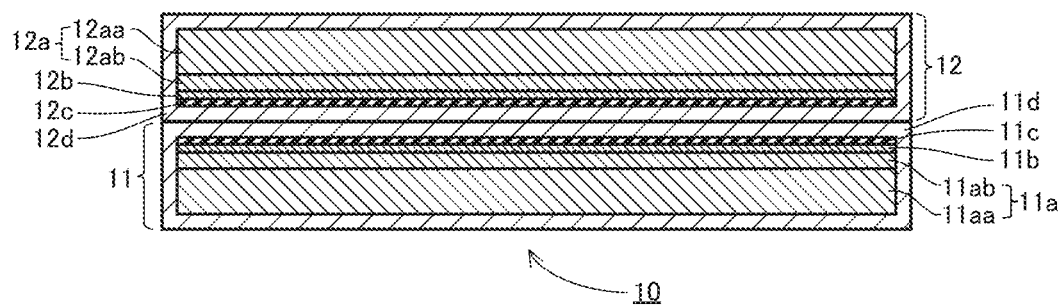
FIG. 6 is a cross-sectional view illustrating a superconductive wire 10 according to a third modification of the embodiment.

FIG. 6 is a cross-sectional view illustrating a superconductive wire 10 according to a third modification of the embodiment. As illustrated in FIG. 6, the superconductive wire 10 does not include the bonding layer 13. In other words, in the superconductive wire 10, the first protective layer 11*d* on the first superconductive layer 11*c* is directly bonded to the second protective layer 12*d* on the second superconductive layer 12*c*.

In this case, the first member 11 and the second member 12 (specifically, the first protective layer 11*d* on the first superconductive layer 11*c* and the second protective layer 12*d* on the second superconductive layer 12*c*) are heated to a predetermined temperature, and bonded together by pressing. The predetermined temperature is, for example, 500° C. or more and 600° C. or less.

Figure 7:
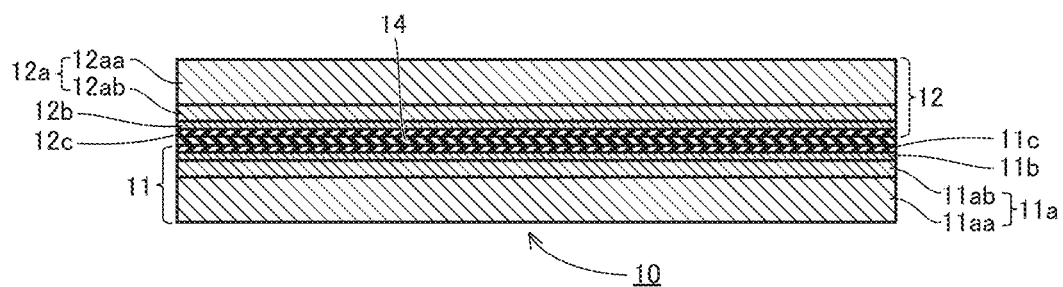
FIG. 7 is a cross-sectional view illustrating a superconductive wire 10 according to a fourth modification of the embodiment.

FIG. 7 is a cross-sectional view illustrating a superconductive wire 10 according to a fourth modification of the embodiment. As illustrated in FIG. 7, the superconductive wire 10 does not include the first protective layer 11*d* and the second protective layer 12*d*, but includes a bonding layer 14 instead of the bonding layer 13. The bonding layer 14 is made of the superconductor that is used to form the first superconductive layer 11*e* and the second superconductive layer 12*c*. In other words, the first superconductive layer 11*c* and the second superconductive layer 12*c* are superconductively bonded.

In this case, the superconductive bonding between the first superconductive layer 11*c* and the second superconductive layer 12*c* is achieved by the following method. Firstly, an organic compound film is formed on one of the first superconductive layer 11*c* and the second superconductive layer 12*c*. The organic compound film contains constituent elements of the superconductor that is used to form the bonding layer 14.

Secondly, the organic compound film is pre-calcined. The organic compound film is converted to a precursor of the superconductor of the bonding layer 14 by the pre-calcination (hereinafter, the organic compound film subjected to the pre-calcination is referred to as a pre-calcined film). The pre-calcination is performed at a temperature lower than the temperature at which the material of the bonding layer 14 is formed. Thirdly, a heat treatment is performed on the pre-calcined film after the pre-calcination. Thereby, carbide contained in the pre-calcined film is decomposed to form a microcrystalline film containing superconductor microcrystals for forming the first superconductive layer 11*c* and the second superconductive layer 12*c*.

Fourthly, the first member 11 and the second member 12 are heated and pressed in a state in which the first superconductive layer 11*c* and the second superconductive layer 12*c* are stacked so as to face each other with the microcrystalline film interposed therebetween. Thus, the superconductor microcrystals contained in the microcrystalline film for forming the first superconductive layer 11*c* and the second superconductive layer 12*c* are epitaxially grown on the first superconductive layer 11*c* and the second superconductive layer 12*c*, respectively. Thereby, the superconductive bonding between the first superconductive layer 11*c* and the second superconductive layer 12*c* is achieved.

(Configuration of Stacked Superconductive Wire)

Hereinafter, the configuration of a stacked superconductive wire 20 according to an embodiment will be described.

Figure 8:
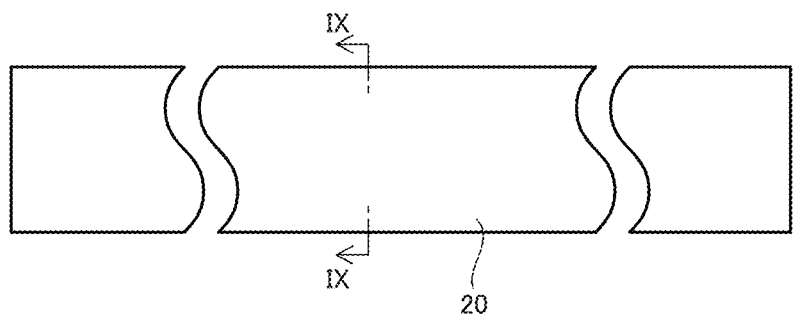
FIG. 8 is a top view illustrating a stacked superconductive wire 20 according to an embodiment.
Figure 9:
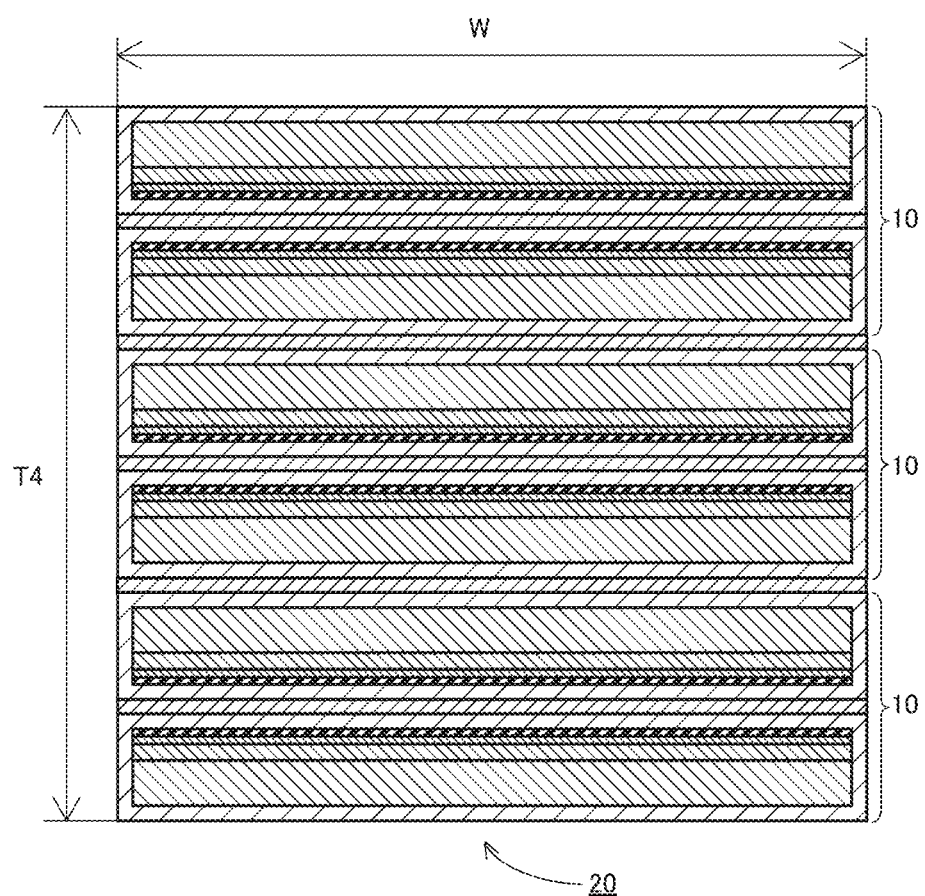
FIG. 9 is a cross-sectional view taken along line IX-IX in FIG. 8.

FIG. 8 is a top view illustrating a stacked superconductive wire 20 according to an embodiment. FIG. 9 is a cross-sectional view taken along line IX-IX in FIG. 8. As illustrated in FIGS. 8 and 9, the stacked superconductive wire 20 includes a plurality of superconductive wires 10. The stacked superconductive wire 20 is obtained by stacking a plurality of superconductive wires 10 along the thickness direction. Although not shown, the superconductive wires 10 are bonded to each other by using a bonding layer made of solder or the like.

The stacked superconductive wire 20 has a thickness T4 and a width W in a cross section orthogonal to the longitudinal direction. The thickness T4 is measured at a location where the thickness of the stacked superconductive wire 20 is maximum, and the width W is measured at a location where the width of the stacked superconductive wire 20 is maximum. The value obtained by dividing the thickness T4 by the width W is 0.5 or more and 2.0 or less. Preferably, the value obtained by dividing the thickness T4 by the width W is 0.75 or more and 1.25 or less.

If the thickness of the first base layer 11 as (the second base layer 12*aa*) is set to about 50 µm to 100 µm, the thickness of the first conductive layer 11*ab* (the second conductive layer 12*ab*) is about 10 µm to 50 µm, the thickness of the first intermediate layer 11*b* (the second intermediate layer 12*b*) is set to about 0.1 µm to 0.5 µm, the thickness of the first superconductive layer 11*c* (the second superconductive layer 12*c*) is set to about 2 µm to 4 µm, the thickness of the first protective layer 11*d* (the second protective layer 12*d*) is set to about 1 µm to 10 µm, and the thickness of the bonding layer 13 is set to about 10 µm, then the thickness T4 is about 150 µm to 300 µm, and if the width W is set to about 1 mm, when several superconductive wires 10 are stacked, the ratio of the thickness T4 to the width W satisfies the relationship of $0.5 \leq T4/W \leq 2.0$.

Figure 10:
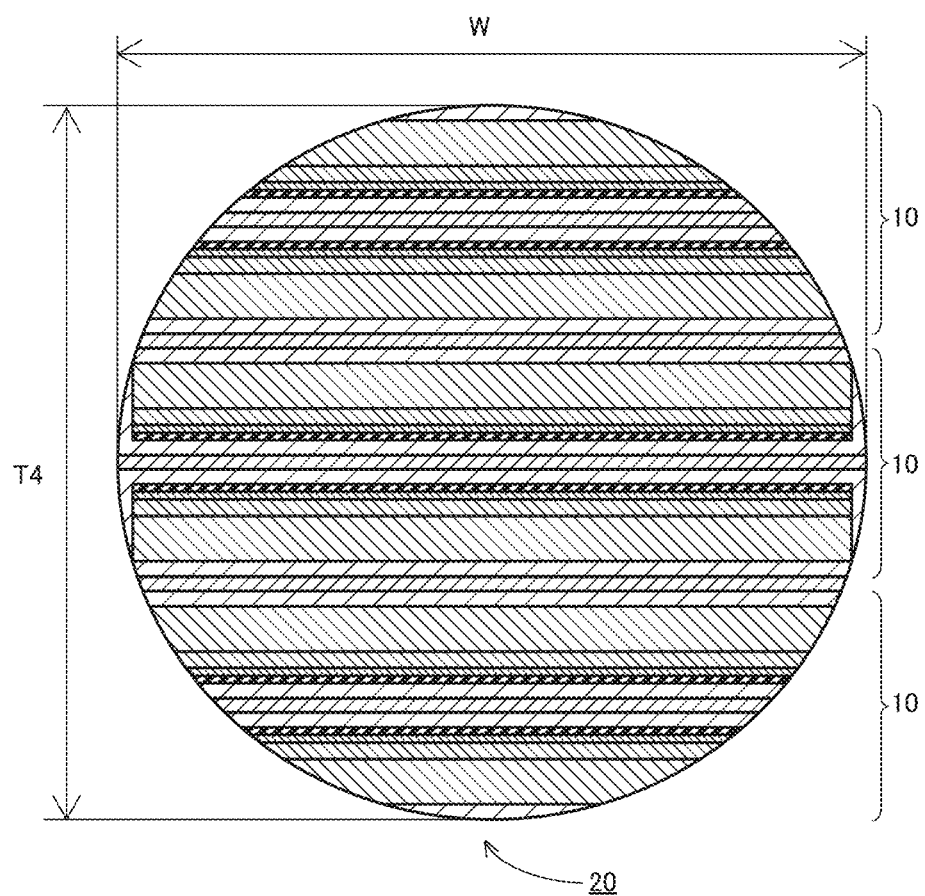
FIG. 10 is a cross-sectional view illustrating a stacked superconductive wire 20 according to a first modification of the embodiment.

FIG. 10 is a cross-sectional view illustrating a stacked superconductive wire 20 according to a first modification of the embodiment. As illustrated in FIG. 10, the cross section orthogonal to the longitudinal direction of the stacked superconductive wire 20 may have, for example, a circular shape.

Figure 11:
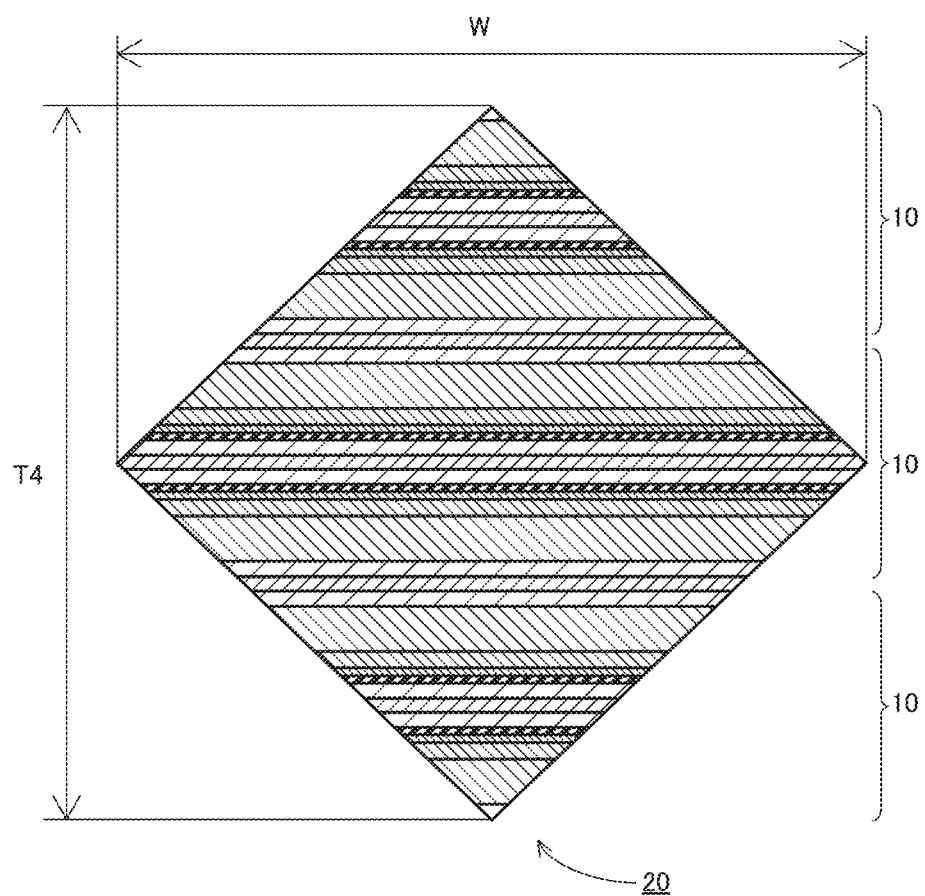
FIG. 11 is a cross-sectional view illustrating a stacked superconductive wire 20 according to a second modification of the embodiment.

FIG. 11 is a cross-sectional view illustrating a stacked superconductive wire 20 according to a second modification of the embodiment. As illustrated in FIG. 11, the cross section orthogonal to the longitudinal direction of the stacked superconductive wire 20 may have, for example, a diamond shape.

Figure 12:
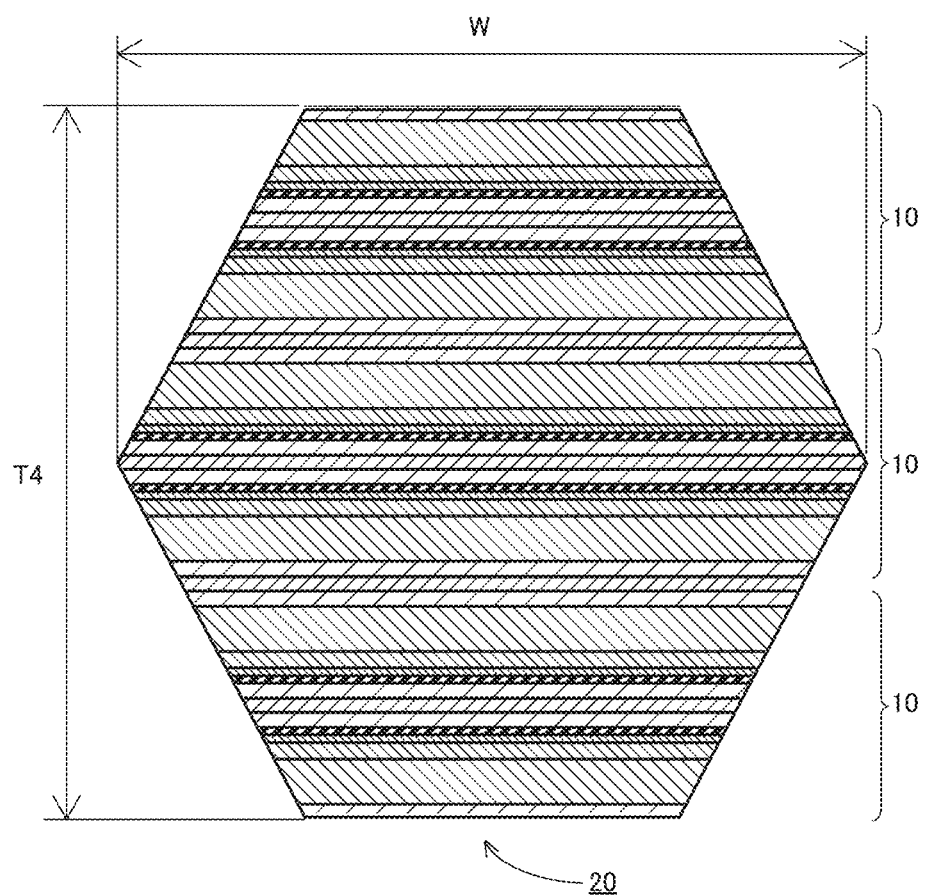
FIG. 12 is a cross-sectional view illustrating a stacked superconductive wire 20 according to a third modification of the embodiment.

FIG. 12 is a cross-sectional view illustrating a stacked superconductive wire 20 according to a third modification of the embodiment. As illustrated in FIG. 12, the cross section orthogonal to the longitudinal direction of the stacked superconductive wire 20 may have, for example, a regular hexagonal shape.

The cross section perpendicular to the longitudinal direction of the stacked superconductive wire 20 is not limited to those illustrated in FIGS. 10 to 12, and may have a polygonal shape or an elliptical shape. The stacked superconductive wire 20 illustrated in FIGS. 10 to 12 is obtained by stacking a plurality of superconductive wires along the thickness direction and then subjecting the stacked superconductive wire to a machining process such as cutting. In any of the cross-sectional shapes illustrated in FIGS. 10 to 12, the relationship of $0.5 \leq T4/W \leq 2.0$ is satisfied.

(Configuration of Superconductive Coil)

Hereinafter, the configuration of a superconductive coil 30 according to an embodiment will be described.

Figure 13:
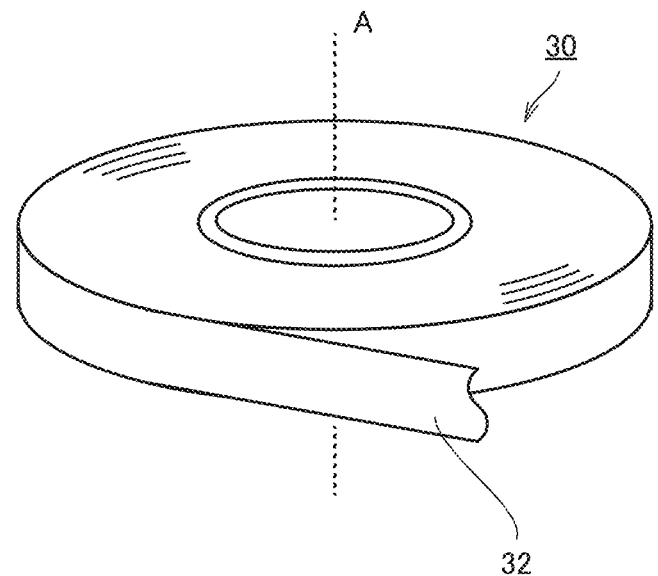
FIG. 13 is a perspective view illustrating a superconductive coil 30 according to an embodiment.
Figure 14:
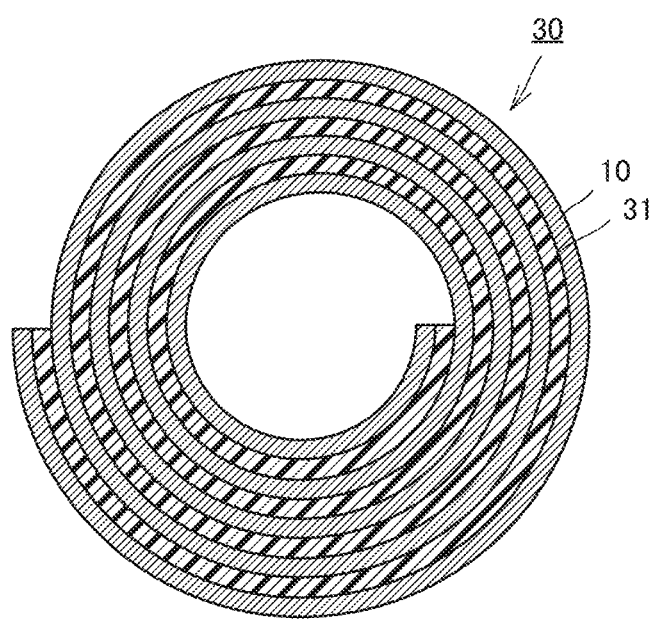
FIG. 14 is a cross-sectional view perpendicular to a central axis A of the superconductive coil 30 according to the embodiment.

FIG. 13 is a perspective view illustrating the superconductive coil 30 according to the embodiment. FIG. 14 is a cross-sectional view perpendicular to a central axis A of the superconductive coil 30 according to the embodiment. As illustrated in FIGS. 13 and 14, the superconductive coil 30 is, for example, a pancake coil. It should be noted that the superconductive coil 30 is not limited thereto. The superconductive coil 30 may be, for example, a solenoid coil.

The superconductive coil 30 has a central axis A. The superconductive coil 30 is formed by winding the superconductive wire 10 around the central axis A. The superconductive wire 10 is fixed in shape by impregnating the superconductive wire 10 with an insulating material 31 such as epoxy resin after being wound around the central axis A.

In order to connect the superconductive coil 30 to an external power source, a portion is drawn out from the superconductive wire 10 wound around the central axis A (the portion drawn out from the superconductive wire 10 wound around the central axis A is referred to as a lead-out portion 32). The minimum radius of curvature $R_{min}$ of the lead-out portion 32 in the superconductive coil 30 is, for example, 20 mm or less.

(Configuration of Superconductive Cable)

Hereinafter, the configuration of a superconductive cable 40 according to an embodiment will be described.

Figure 15:
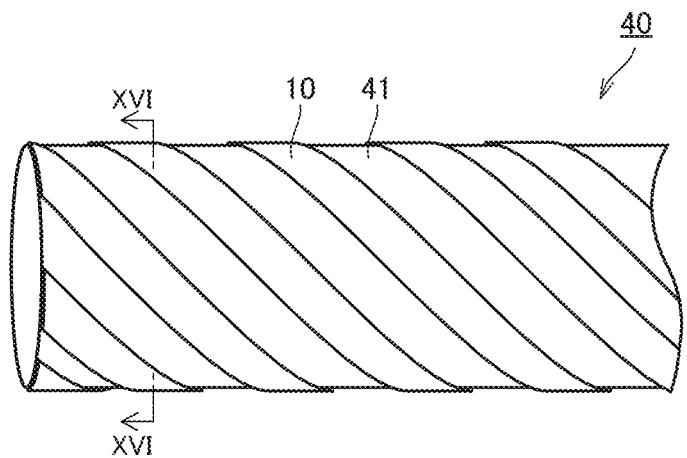
FIG. 15 is a side view illustrating a superconductive cable 40 according to an embodiment.

FIG. 15 is a side view illustrating the superconductive cable 40 according to the embodiment. As illustrated in FIG. 15, the superconductive cable 40 includes a former 41 and a superconductive wire 10. The superconductive wire 10 is spirally wound around the central axis of the former 41 on the outer peripheral surface of the former 41.

Figure 16:
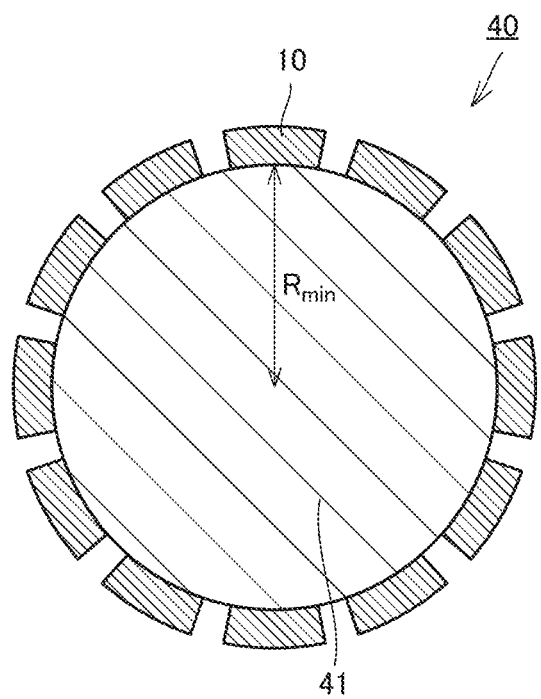
FIG. 16 is a cross-sectional view taken along line XVI-XVI of FIG. 15.

FIG. 16 is a cross-sectional view taken along line XVI-XVI of FIG. 15. As illustrated in FIG. 16, the minimum radius of curvature $R_{min}$ of the superconductive wire is 20 mm or less after being wound on the outer peripheral surface of the former 41.

(Effects of Superconductive Wire, Stacked Superconductive Wire, Superconductive Coil, and Superconductive Cable)

Hereinafter, effects of the superconductive wire 10, the stacked superconductive wire 20, the superconductive coil 30, and the superconductive cable 40 according to the embodiment will be described.

<Effects of Superconductive Wire>

First, the basic effects of the superconductive wire 10 will be described.

In the superconductive wire 10, the first superconductive layer 11c is electrically connected to the first substrate 11a made of a conductive material via the first intermediate layer 11b made of a conductive material. The first superconductive layer 11c is further electrically connected to the second superconductive layer 12c. Therefore, when a quench occurs in the first superconductive layer 11c, the electric current flowing in the first superconductive layer 11c is bypassed to the first substrate 11a and the second superconductive layer 12c. Similarly, when a quench occurs in the second superconductive layer 12c, the electric current flowing in the second superconductive layer 12c is bypassed to the second substrate 12a and the first superconductive layer 11c.

Thus, in the superconductive wire 10, when a quench occurs in the first superconductive layer 11c (or the second superconductive layer 12c), the electric current flowing in the first superconductive layer 11c (or the second superconductive layer 12c) is bypassed by two paths. Therefore, according to the superconductive wire 10, the anti-quench resistance is improved.

In the superconductive wire 10, since the first member 11 and the second member 12 are stacked along the thickness direction so that the first superconductive layer 11c and the second superconductive layer 12c face each other, the first superconductive layer 11c and the second superconductive layer 12c are disposed relatively close to the neutral line of the superconductive wire 10.

The bending stress δ, the bending moment M, the cross-sectional secondary moment I, and the distance y from the neutral line satisfy the relationship of $δ=(M/I) \times y$. In other words, the portion of the superconductive wire 10 which is relatively close to the neutral line has a smaller value of y, and thereby, the bending stress acting thereon is smaller. Accordingly, it is possible to reduce the bending stress acting on the first superconductive layer 11c and the second superconductive layer 12c in the superconductive wire 10, and as a result, it is possible to prevent the first superconductive layer 11c and the second superconductive layer 12c from being damaged.

Next, an additional effect of the superconductive wire 10 will be described.

In the case where the first superconductive layer 11c and the second superconductive layer 12c are superconductively bonded, when a quench occurs in the first superconductive layer 11c (or the second superconductive layer 12c), the electric current flowing in the first superconductive layer 11c (or the second superconductive layer 12c) may be bypassed to the second superconductive layer 12c (or the first superconductive layer 11c) without passing through the normal conductor (the first protective layer 11d and the second protective layer 12d). In addition, in this case, since the thickness of the superconductive layer is substantially large, the local degradation of characteristics is less likely to occur in the superconductive layers (the first superconductive layer 11c and the second superconductive layer 12c).

In the case where the first protective layer 11d and the second protective layer 12d are made of silver or a silver alloy, since the first protective layer 11d and the second protective layer 12d are relatively easily deformed, the first protective layer 11d and the second protective layer 12d may be directly bonded to each other by heating and pressing. Since silver or a silver alloy has a lower electric resistance than the material (typically, tin (Sn) alloy) constituting the bonding layer 13, it is possible to reduce the electric resistance when bypassing the electric current that flows in the first superconductive layer 11c (or the second superconductive layer 12c) to the second superconductive layer 12c (or the first superconductive layer 11c).

In the case where the first protective layer 11d and the second protective layer 12d are made of silver or a silver alloy, since silver or a silver alloy may be satisfactorily bonded to the material (typically, a tin alloy) of the bonding layer 13, it is possible to satisfactorily bond the first protective layer 11d and the second protective layer 12d via the bonding layer 13.

As described above, the first protective layer 11d (or the second protective layer 12d) is only used to bypass the electric current to the second superconductive layer 12c (or the first superconductive layer 11c) when a quench occurs in the first superconductive layer 11c (or the second superconductive layer 12c). Therefore, even if the first protective layer 11d and the second protective layer 12d are formed to be relatively thin, the influence on the anti-quench resistance is small. On the other hand, since the first protective layer 11d and the second protective layer 12d may be formed to be relatively thin, the first superconductive layer 11c and the second superconductive layer 12c may be arranged closer to the neutral line of the superconductive wire 10, which makes it possible to further reduce the bending stress acting on the first superconductive layer 11c and the second superconductive layer 12c when the superconductive wire 10 is being bent.

As described above, when a quench occurs in the first superconductive layer 11c (or the second superconductive layer 12c), the electric current flowing in the first superconductive layer 11c (or the second superconductive layer 12c) is also bypassed to the first substrate 11a (or the second substrate 12a). In the case where the first substrate 11a includes the first conductive layer 11ab (or in the case where the second substrate 12a includes the second conductive layer 12ab), the bypassed current flows through the first conductive layer 11ab (or the second conductive layer 12ab) having a relatively low electric resistance, which makes it possible to further reduce the electric resistance when bypassing the electric current.

In the case where at least one of the first conductive layer 11ab and the second conductive layer 12ab is exposed at the first end 10a (and/or the second end 10b) by removing at least one of the first base layer 11aa and the second base layer 12aa therefrom, it is possible to connect the superconductive wire to an external power source via the first conductive layer 11ab or the second conductive layer 12ab having a relatively low electric resistance.

In the case where both the first conductive layer 11ab and the second conductive layer 12ab are exposed at the first end 10a (and/or the second end 10b) by removing both the first base layer 11 aa and the second base layer 12aa therefrom, it is possible to connect the superconductive wire to an external power source via both the first conductive layer 11ab and the second conductive layer 12ab having a relatively low electric resistance, which makes it possible to further reduce the connection resistance to the external power supply.

In the case where only one of the first conductive layer 11ab and the second conductive layer 12ab is exposed at the first end 10a (and/or the second end 10b) by removing only one of the first base layer 11aa and the second base layer 12aa therefrom, it is possible to connect the superconductive wire to an external power source via the first conductive layer 11ab (or the second conductive layer 12ab) having a relatively low electric resistance while maintaining the rigidity of the first end 10a (and/or the second end 10b) via the second base layer 12aa (or the first base layer 11aa). As a result, the handling of the superconductive wire 10 is improved.

<Effects of Stacked Superconductive Wire>

A conventional superconductive wire may have a width which is several tens of times larger than its thickness. Such a superconductive wire is difficult to be handled due to the large dimension. Since the stacked superconductive wire 20 is obtained by stacking a plurality of superconductive wires 10 in the thickness direction, and thereby satisfies the relationship of $0.5 \leq T4/W \leq 2.0$, the handling of the stacked superconductive wire 20 is improved.

<Effects of Superconductive Coil>

If the superconductive wire 10 is impregnated with the insulating material 31 while being wound around the central axis A, due to the difference in thermal expansion coefficient between the superconductive wire 10 and the insulating material 31, a tensile stress may act on the superconductive wire in a direction of peeling off the superconductive layer. This tensile stress may peel the superconductive layer off from the superconductive wire.

However, since the first superconductive layer 11c and the second superconductive layer 12c in the superconductive wire 10 are sandwiched between the first substrate 11a and the second substrate 12a, the tensile stress acting on the first superconductive layer 11c and the second superconductive layer 12c is reduced. Therefore, according to the superconductive coil 30, it is possible to prevent the first superconductive layer 11c and the second superconductive layer 12c from being peeled off by the tensile stress caused by the difference in thermal expansion coefficient between the superconductive wire 10 and the insulating material 31.

In the superconductive coil 30, the radius of curvature of the lead-out portion 32 may be made relatively small. In the superconductive wire 10, since the first superconductive layer 11c and the second superconductive layer 12c are arranged close to the neutral line of the superconductive wire 10, the bending stress acting on the first superconductive layer 11c and the second superconductive layer 12c when the superconductive wire 10 is being bent may be reduced. Therefore, it is possible to form the superconductive coil 30 in which the lead-out portion 32 has a minimum radius of curvature $R_{min}$ of 20 mm or less by using the superconductive wire 10.

<Effects of Superconductive Cable>

As described above, in the superconductive wire 10, the bending stress acting on the first superconductive layer 11c and the second superconductive layer 12c when the superconductive wire 10 is being bent may be reduced. Therefore, it is possible to form the superconductive cable 40 which has a minimum radius of curvature $R_{min}$ of 20 mm or less by using the superconductive wire 10.

It should be understood that the embodiments disclosed herein have been presented for the purpose of illustration and description but not limited in all aspects. It is intended that the scope of the present disclosure is not limited to the description above but defined by the scope of the claims and encompasses all modifications equivalent in meaning and scope to the claims.

REFERENCE SIGNS LIST

10: superconductive wire; 10a: first end; 10b: second end; 11: first member; 11a: first substrate; 11aa: first base layer; 11ab: first conductive layer; 11b: first intermediate layer; 11c: first superconductive layer; 11d: first protective layer; 12: second member; 12a: second substrate; 12aa: second base layer; 12ab: second conductive layer; 12b: second intermediate layer; 12c: second superconductive layer; 12d: second protective layer; 13: bonding layer; 14: bonding layer; 15: lead; $R_{min}$: minimum radius of curvature; T1, T2, T3, T3, T4: thickness; W: width; 20: stacked superconductive wire; 30: superconductive coil; 31: insulating material; 32: lead-out portion; 40: superconductive cable; 41: former

The invention claimed is:

1. A superconductive wire comprising:
a first member; and
a second member,
the first member including a first substrate made of a conductive material, a first intermediate layer made of a conductive material and disposed on the first substrate, and a first superconductive layer made of a superconductive material and disposed on the first intermediate layer, the first superconductive layer and the first substrate to be electrically connected to each other by the first intermediate layer,
the second member including a second substrate made of a conductive material, a second intermediate layer made of a conductive material and disposed on the second substrate, and a second superconductive layer made of a superconductive material and disposed on the second intermediate layer, the second superconductive layer and the second substrate to be electrically connected to each other by the second intermediate layer,
the first member and the second member being stacked along a thickness direction of the superconductive wire so that the first superconductive layer and the second superconductive layer face each other, and
the first superconductive layer being electrically connected to the second superconductive layer.

2. The superconductive wire according to claim 1, wherein
the first superconductive layer is superconductively bonded to the second superconductive layer.

3. The superconductive wire according to claim 1, wherein
the first member further includes a first protective layer made of silver or a silver alloy and disposed on the first superconductive layer,
the second member further includes a second protective layer made of silver or a silver alloy and disposed on the second superconductive layer, and
the first protective layer is directly bonded to the second protective layer.

4. The superconductive wire according to claim 1, wherein
the superconductive wire further includes a bonding layer,
the first member further includes a first protective layer made of a conductive material and disposed on the first superconductive layer,
the second member further includes a second protective layer made of a conductive material and disposed on the second superconductive layer, and
the first protective layer is bonded to the second protective layer via the bonding layer.

5. The superconductive wire according to claim 4, wherein
the first protective layer and the second protective layer are made of silver or a silver alloy, and
the bonding layer is made of solder.

6. The superconductive wire according to claim 4, wherein
the bonding layer is exposed at an end of the superconductive wire in the longitudinal direction by removing either the first member or the second member therefrom.

7. The superconductive wire according to claim 4, wherein
the first protective layer and the second protective layer each has a thickness of 5 μm or less.

8. The superconductive wire according to claim 1, wherein
the first substrate includes a first base layer, and a first conductive layer made of a material having a lower electric resistance than a material of the first base layer and disposed between the first base layer and the first intermediate layer,
the second substrate includes a second base layer, and a second conductive layer made of a material having a lower electric resistance than a material of the second base layer and disposed between the second base layer and the second intermediate layer.

9. The superconductive wire according to claim 8, wherein
the first conductive layer is exposed at an end of the superconductive wire in the longitudinal direction by removing the first base layer therefrom.

10. The superconductive wire according to claim 8, wherein
the second conductive layer is exposed at an end of the superconductive wire in the longitudinal direction by removing the second base layer therefrom.

11. The superconductive wire according to claim 8, wherein
the first conductive layer and the second conductive layer are made of copper or a copper alloy, and
the first base layer and the second base layer are made of stainless steel or Hastelloy.

12. The superconductive wire according to claim 1, wherein
the first member and the second member are spaced from each other at an end of the superconductive wire in the longitudinal direction.

13. A stacked superconductive wire comprising a plurality of superconductive wires according to claim 1,
the plurality of superconductive wires being stacked along a thickness direction of the stacked superconductive wire, and
a value obtained by dividing a thickness of the stacked superconductive wire by a width of the stacked superconductive wire in a direction orthogonal to the longitudinal direction of the stacked superconductive wire being 0.5 or more and 2.0 or less.

14. A superconductive coil comprising:
the superconductive wire according to claim 1; and
an insulating material, the superconductive wire being wound around a central axis of the superconductive coil and impregnated with the insulating material.

15. The superconductive coil according to claim 14, wherein
the superconductive wire has a lead-out portion drawn out from the superconductive wire wound around the central axis of the superconductive coil, and
a minimum radius of curvature of the lead-out portion in the superconductive wire is 20 mm or less.

16. A superconductive cable comprising:
the superconductive wire according to claim 1; and
a former,
the superconductive wire being spirally wound around a central axis of the former on an outer peripheral surface of the former, and
a minimum radius of curvature of the superconductive wire being 20 mm or less.

* * * * *